(12) United States Patent
Chang et al.

(10) Patent No.: US 12,469,438 B2
(45) Date of Patent: Nov. 11, 2025

(54) DISPLAY APPARATUS

(71) Applicant: AUO Corporation, Hsinchu (TW)

(72) Inventors: Che-Chia Chang, Hsinchu (TW);
Che-Wei Tung, Hsinchu (TW);
En-Chih Liu, Hsinchu (TW); Yu-Chieh Kuo, Hsinchu (TW); Mei-Yi Li, Hsinchu (TW); Ming-Hung Chuang, Hsinchu (TW); Yu-Hsun Chiu, Hsinchu (TW); Chen-Chi Lin, Hsinchu (TW); Cheng-Hsing Lin, Hsinchu (TW); Shu-Wen Tzeng, Hsinchu (TW); Jui-Chi Lo, Hsinchu (TW); Ming-Yang Deng, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/773,581

(22) Filed: Jul. 16, 2024

(65) Prior Publication Data

US 2025/0111821 A1 Apr. 3, 2025

(30) Foreign Application Priority Data

Sep. 28, 2023 (TW) ................................ 112137242

(51) Int. Cl.
*G09G 3/32* (2016.01)

(52) U.S. Cl.
CPC ....... *G09G 3/32* (2013.01); *G09G 2310/0286* (2013.01); *G09G 2310/08* (2013.01)

(58) Field of Classification Search
CPC ............. G09G 3/3266; G09G 2310/08; G09G 3/3233; G09G 2310/0286; G09G 3/006; G09G 3/32; G09G 2300/0809; G09G 2310/0267

See application file for complete search history.

(56) References Cited

U.S. PATENT DOCUMENTS

| 8,497,855 | B2 | 7/2013 | Park |
| 10,997,923 | B2 | 5/2021 | Lim et al. |
| 11,443,675 | B2 | 9/2022 | Chang et al. |
| 2011/0273418 | A1 | 11/2011 | Park |
| 2020/0135115 | A1* | 4/2020 | Chang .................. G09G 3/3233 |
| 2020/0193911 | A1* | 6/2020 | Lim ...................... G09G 3/3266 |
| 2021/0201814 | A1* | 7/2021 | Choi ..................... G09G 3/3275 |

FOREIGN PATENT DOCUMENTS

| KR | 20110123584 | 11/2011 |
| KR | 20110124075 | 11/2011 |
| KR | 20200075164 | 6/2020 |
| TW | I819818 | 10/2023 |

* cited by examiner

*Primary Examiner* — Muhammad N Edun
(74) *Attorney, Agent, or Firm* — JCIPRNET

(57) ABSTRACT

A display apparatus is provided. The display apparatus includes a display module and multiple light-emitting driving circuits. Each of the light-emitting driving circuits includes a timing control circuit and a driving circuit. The timing control circuit receives multiple clock signals and a previous light-emitting timing signal to provide a light-emitting timing signal and an internal voltage. The driving circuit receives a first phase signal among multiple phase signals and the internal voltage to provide a light-emitting driving signal to the display module based on the first phase signal and the internal voltage. The phase signals all present disabled levels during a vertical blank period.

18 Claims, 14 Drawing Sheets

DISPLAY APPARATUS

CROSS-REFERENCE TO RELATED APPLICATION

This application claims the priority benefit of Taiwan application serial no. 112137242, filed on Sep. 28, 2023. The entirety of the above-mentioned patent application is hereby incorporated by reference herein and made a part of this specification.

BACKGROUND

Technical Field

The disclosure relates to a display apparatus, and more particularly, to a light-emitting diode display apparatus.

Description of Related Art

In modern times, since a light-emitting diode display has self-luminous properties, a backlight module may be omitted, thereby reducing volume and weight to become thinner, making it more competitive in the future. Compared to an organic light-emitting diode (OLED) display, the light-emitting diode display further has advantages of high material stability, long service life, high brightness, nanosecond-level high-speed response, high-speed modulation, and signal carrying. Therefore, the light-emitting diode display has gradually become a mainstream in development of new-generation displays.

Different from a voltage driving mode of a liquid crystal display (LCD), a micro-LED is a current-driven light-emitting element. Therefore, a driving mode of the micro-LED is an important design issue in the light-emitting diode display.

SUMMARY

The disclosure provides a display apparatus, which may enable pixels to stop emitting light during a vertical blank period under a multi-light-emitting operation to detect abnormality of a panel.

A display apparatus includes a display module and multiple light-emitting driving circuits. Each of the light-emitting driving circuits includes a timing control circuit and a driving circuit. The timing control circuit receives multiple clock signals and a previous light-emitting timing signal to provide a light-emitting timing signal and an internal voltage. The driving circuit receives a first phase signal among multiple phase signals and the internal voltage, and provides a light-emitting driving signal to the display module based on the first phase signal and the internal voltage. The phase signals all present a disabled level during a vertical blank period.

Based on the above, in the display apparatus of the embodiment of the disclosure, the light-emitting driver provides the multiple enabled light-emitting driving signals based on the phase signals, and the phase signals all present the disabled levels during the vertical blank period, so that the light-emitting driving signals provided by the light-emitting driving circuit will be disabled at the same time. In this way, the display apparatus may enable the pixels to stop emitting the light during the vertical blank period under the multi-light-emitting operation, so as to detect the abnormality of the panel in the display module.

In order for the aforementioned features and advantages of the disclosure to be more comprehensible, embodiments accompanied with drawings are described in detail below.

DETAILED DESCRIPTION OF DISCLOSED EMBODIMENTS

Unless otherwise defined, all terms (including technical and scientific terms) used herein have the same meaning as commonly understood by persons skilled in the art of the disclosure. It will be further understood that terms such as those defined in commonly used dictionaries should be interpreted as having meanings consistent with the meanings in the related art and the context of the disclosure, and will not be interpreted as having idealized or overly formal meanings unless explicitly defined herein.

It should be understood that although terms such as "first", "second", and "third" may be used herein to describe various elements, components, regions, layers, and/or portions, the elements, components, regions, and/or portions are not limited by the terms. The terms are only used to distinguish one element, component, region, layer, or portion from another element, component, region, layer, or portion. Therefore, a first "element", "component", "region", "layer", or "portion" discussed below may be referred to as a second element, component, region, layer, or portion without departing from the teachings herein.

The terms used herein are only for the purpose of describing specific embodiments and are not limiting. As used herein, unless the content clearly indicates otherwise, the singular forms "a", "one", and "the" are intended to include plural forms, including "at least one" or representing "and/or". As used herein, the term "and/or" includes any and all combinations of one or more of the relevant listed items. It should also be understood that when used in the specification, the terms "containing" and/or "including" designate the presence of the feature, the region, the entirety, the step, the operation, the element, and/or the component, but do not exclude the presence or the addition of one or more other features, regions, entireties, steps, operations, elements, components, and/or combinations thereof.

Figure 1:
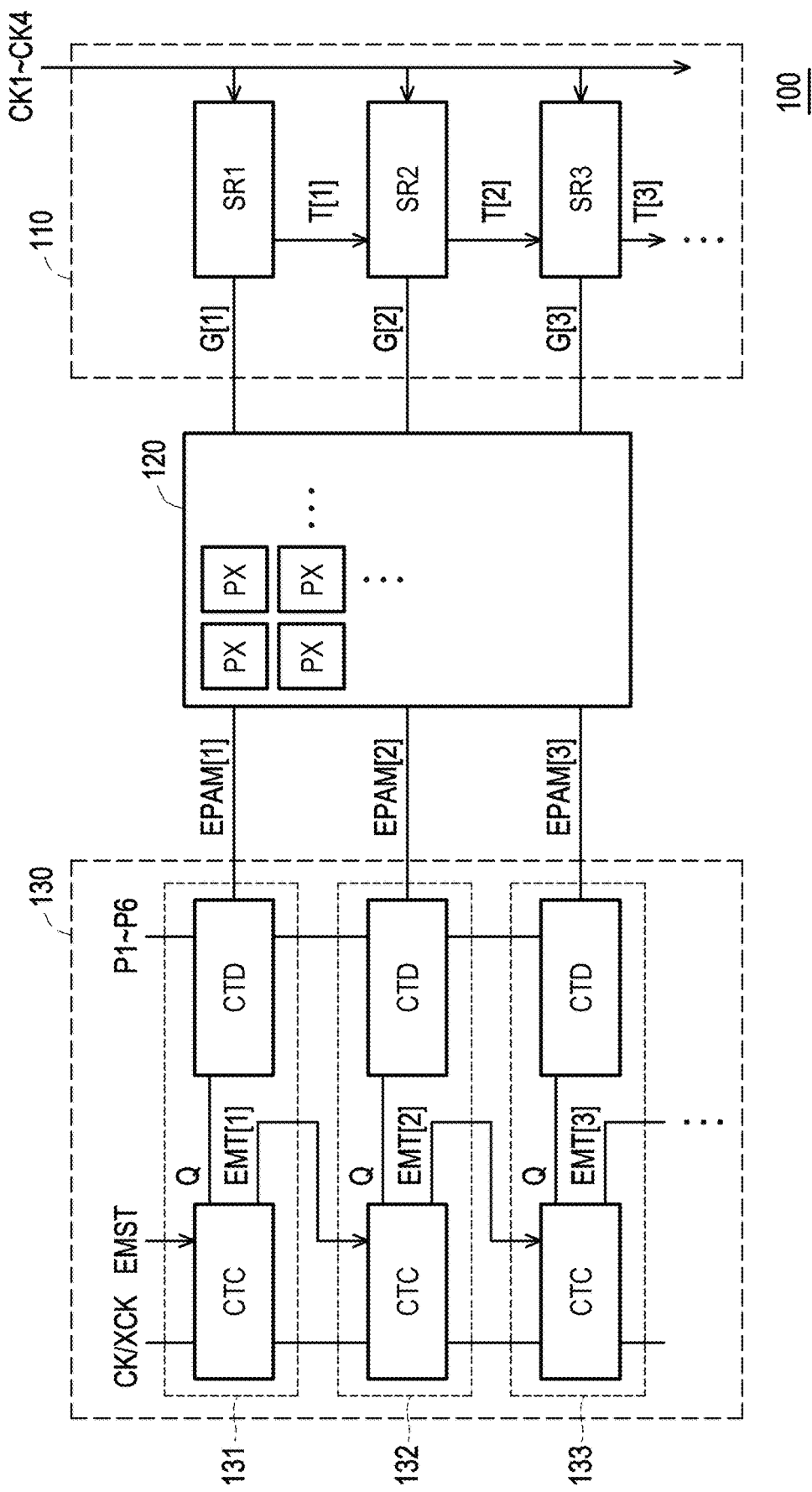
FIG. 1 is a schematic diagram of a system of a display apparatus according to an embodiment of the disclosure.

FIG. 1 is a schematic diagram of a system of a display apparatus according to an embodiment of the disclosure. Referring to FIG. 1, in this embodiment, a display apparatus 100 at least includes a gate driver 110, a display module 120, and a light-emitting driver 130. The gate driver 110 includes multiple shift registers (such as SR1 to SR3), and the light-emitting driver 130 includes multiple light-emitting driving circuits (such as 131 to 133).

Each of the shift registers (such as SR1 to SR3) receives multiple clock signals (such as CK1 to CK4), and provides multiple gate driving signals (such as G[1] to G[3]) and multiple gate timing signals (such as T[1] to T[3]) based on the received clock signals (such as CK1 to CK4). The gate driving signals (such as G[1] to G[3]) are provided to the display module 120, and the gate driving signals (such as G[1] to G[3]) are enabled in sequence to turn on (or enable) pixels PX on the display module 120 row by row.

Each of the light-emitting driving circuits (such as 131 to 133) includes a timing control circuit CTC and a driving circuit CTD. The timing control circuit CTC receives clock signals CK and XCK, and receives previous light-emitting timing signals (EMT[1] to EMT[3]) or a light-emitting start signal EMST, so as to provide the light-emitting timing signals (such as EMT[1] to EMT[3]) and an internal voltage Q.

The driving circuit CTD receives one of multiple phase signals (such as P1 to P6) (corresponding to a first phase signal) and the internal voltage Q to provide light-emitting driving signals (such as EPAM[1] to EPAM[3]) to the display module 120 based on the received phase signals (such as P1 to P6) and the internal voltage Q.

Figure 3:
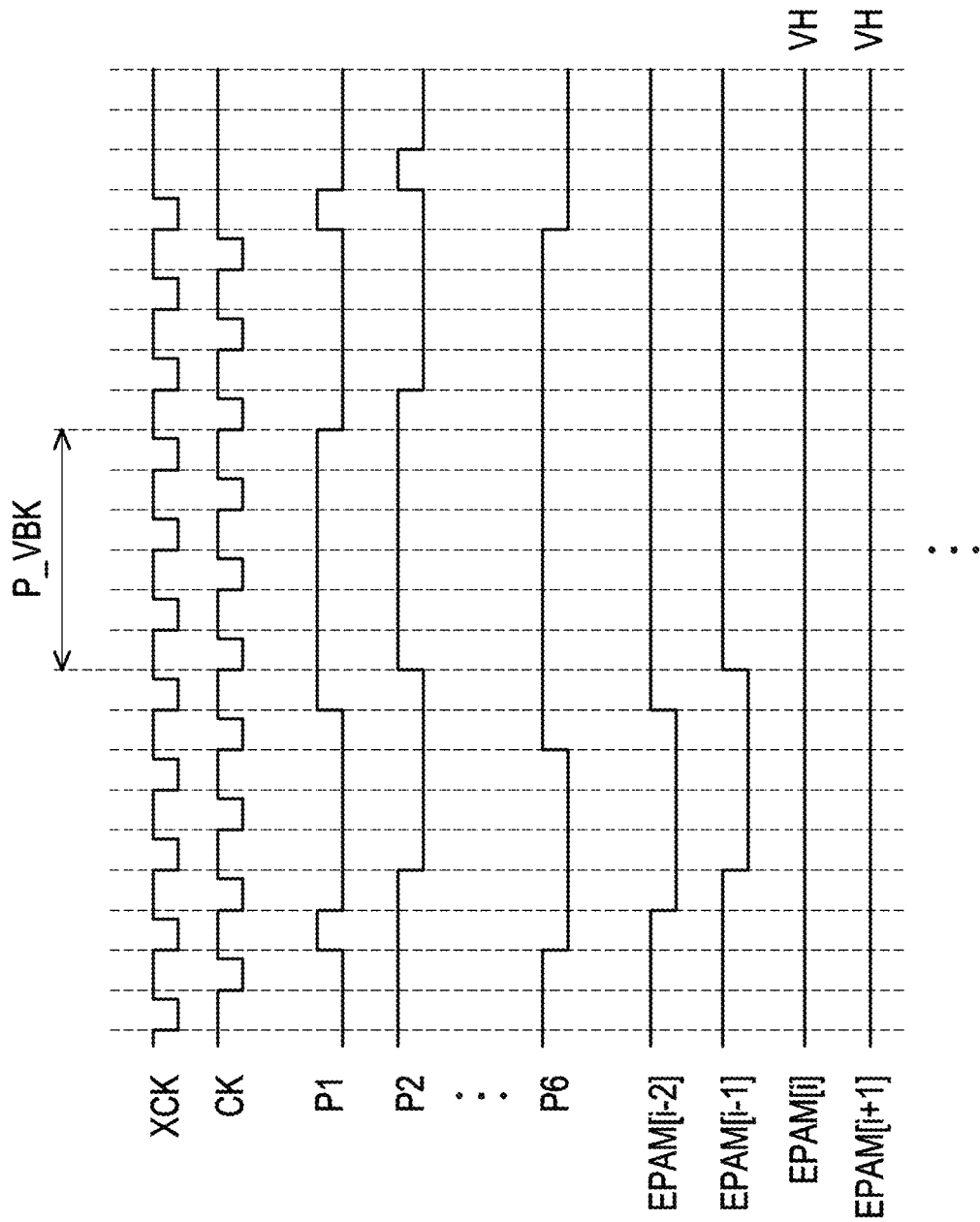
FIG. 3 is a schematic diagram of a driving timing of a light-emitting driving circuit according to an embodiment of the disclosure.

In this embodiment, the phase signals (such as P1 to P6) may only be provided to the light-emitting driving circuits (such as 131 to 133) of the light-emitting driver 130, while the light-emitting driving signals (such as EPAM[1] to EPAM[3]) will be enabled multiple times during one frame period based on the phase signals (such as P1 to P6) received by the driving circuit CTD, so that the pixels in one raw are lit multiple times in one frame. In addition, the phase signals P1 to P6 all present disabled levels during a vertical blank period (P_VBK as shown in FIG. 3), so that the light-emitting driving signals (such as EPAM[1] to EPAM[3]) provided by the light-emitting driving circuits (such as 131 to 133) will be disabled at the same time. In this way, the display device 100 may enable the pixels PX to stop emitting light during the vertical blank period (P_VBK as shown in FIG. 3) under a multi-light-emitting operation, so as to detect abnormality of a panel in the display module 120.

In this embodiment, the pixels PX of the display module 120 are arranged in an array, and the pixels PX in the display module 120 may be dispsoed on one or more panels (i.e., one or more substrates), which depends on a circuit design, and the embodiment of the disclosure is not limited thereto.

Figure 2:
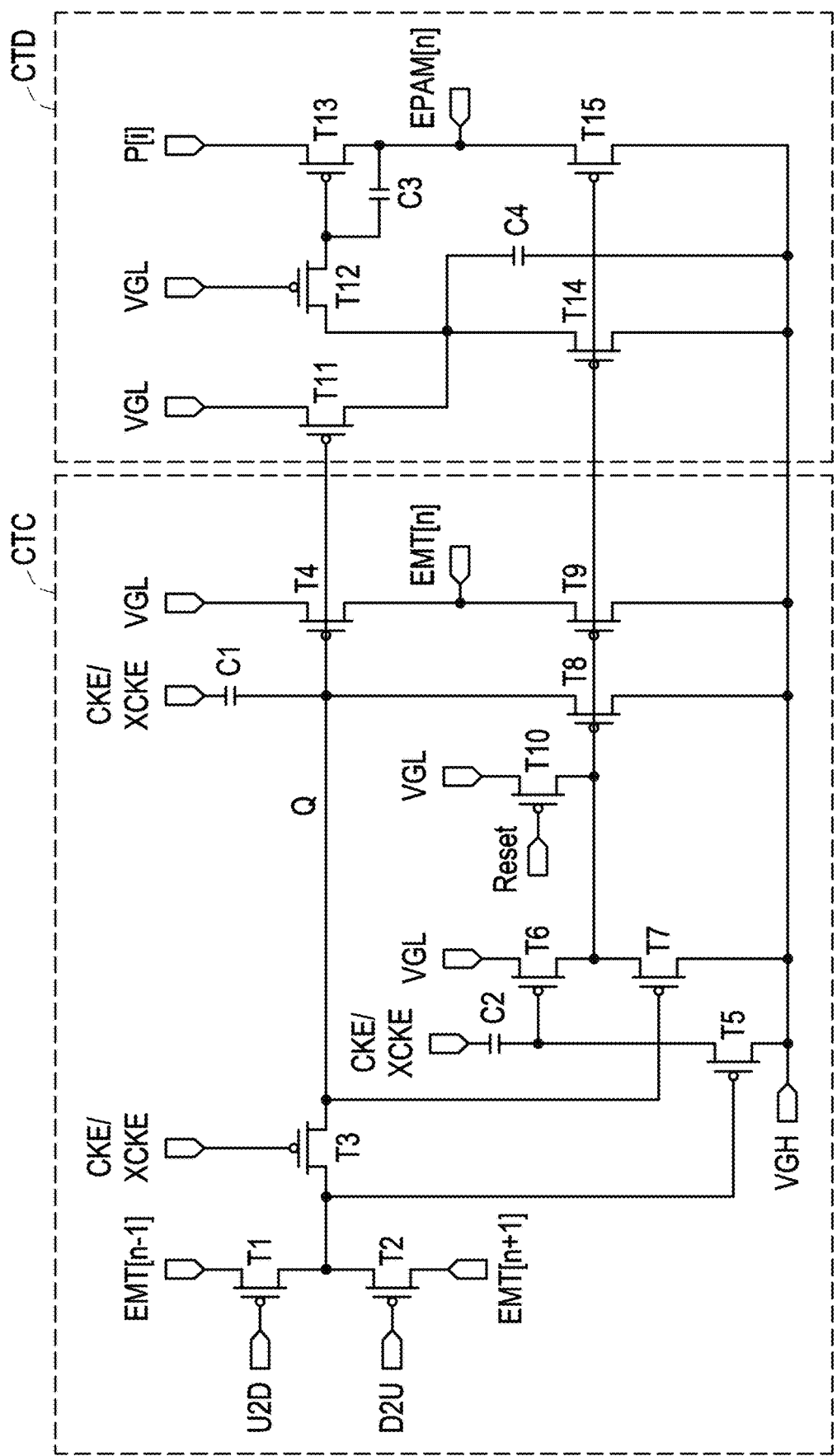
FIG. 2 is a schematic circuit diagram of a light-emitting driving circuit according to an embodiment of the disclosure.

FIG. 2 is a schematic circuit diagram of a light-emitting driving circuit according to an embodiment of the disclosure. Referring to FIGS. 1 and 2, in this embodiment, the timing control circuit CTC includes transistors T1 to T10 (corresponding to a first transistor to a tenth transistor), a first capacitor C1, and a second capacitor C2. A P-type transistor is taken as an example for the transistors T1 to T10, but the embodiment of the disclosure is not limited thereto.

The transistor T1 has a first end receiving a previous light-emitting timing signal EMT[n−1], a control end receiving a first direction scanning signal U2D, and a second end, where n is a positive integer. The transistor T2 has a first end coupled to the second end of the transistor T1, a control end receiving a second direction scanning signal D2U, and a second end receiving a previous light-emitting timing signal EMT[n+1]. The transistor T3 has a first end coupled to the second end of the transistor T1, a control end receiving one of the clock signals CK and XCK (corresponding to a first clock signal), and a second end coupled to the internal voltage Q.

The transistor T4 has a first end receiving a first gate voltage VGL, a control end receiving the internal voltage Q, and a second end providing a light-emitting timing signal EMT[n]. The first capacitor C1 is coupled between the other one of the clock signals CK and XCK (corresponding to a second clock signal) and the control end of the transistor T4. The transistor T5 has a first end, a control end coupled to the second end of the transistor T1, and a second end receiving a second gate voltage VGH. The second gate voltage VGH may be higher than the first gate voltage VGL, but the embodiment of the disclosure is not limited thereto, which depends on the circuit design.

The second capacitor C2 is coupled between one of the clock signals CK and XCK and the first end of the transistor T5. The transistor T6 has a first end receiving the first gate voltage VGL, a control end coupled to the first end of the transistor T5, and a second end. The transistor T7 has a first end coupled to the second end of the transistor T6, a control end receiving the internal voltage Q, and a second end receiving the second gate voltage VGH.

The transistor T8 has a first end receiving the internal voltage Q, a control end coupled to the second end of the transistor T6, and a second end receiving the second gate voltage VGH. The transistor T9 has a first end coupled to the second end of the transistor T4, a control end coupled to the second end of the transistor T6, and a second end receiving the second gate voltage VGH. The transistor T10 has a first end receiving the first gate voltage VGL, a control end receiving a reset signal Reset, and a second end coupled to the second end of the transistor T6.

In this embodiment, the driving circuit CTD includes transistors T11 to T15 (corresponding to a fifteenth transistor to a nineteenth transistor), a third capacitor C3, and a fourth capacitor C4. The P-type transistor is taken as an example for the transistors T11 to T15, but the embodiment of the disclosure is not limited thereto.

The transistor T11 has a first end receiving the first gate voltage VGL, a control end receiving the internal voltage Q, and a second end. The transistor T12 has a first end coupled to the second end of the transistor T11, a control end receiving the first gate voltage VGL, and a second end. The transistor T13 has a first end receiving a first phase signal P[i] (i.e., one of the phase signals P1 to P6), a control end coupled to the second end of the transistor T12, and a second end providing a light-emitting driving signal EPAM[n]. The third capacitor C3 is coupled between the control end of the transistor T13 and the second end of the transistor T13. The transistor T14 has a first end coupled to the second end of the transistor T11, a control end coupled to the second end of the transistor T6, and a second end receiving the second gate voltage VGH. The fourth capacitor C4 is coupled between the second end of the transistor T11 and the second gate voltage VGH. The transistor T15 has a first end coupled to the second end of the transistor T13, a control end coupled to the second end of the transistor T6, and a second end receiving the second gate voltage VGH.

FIG. 3 is a schematic diagram of a driving timing of a light-emitting driving circuit according to an embodiment of the disclosure. Referring to FIGS. 1 to 3, in this embodiment, the driving circuit CTD will directly output the received phase signals (such as P1 to P6) as corresponding light-emitting driving signals (such as EPAM[i−2] to EPAM[i+1]), where i is a leading number. For example, the driving circuit CTD will directly output the phase signal P1 as the light-emitting driving signal EPAM[i−2], and the driving circuit CTD will directly output the phase signal P2 as the light-emitting driving signal EPAM[i−1]. Then, during the vertical blank period P_VBK, the phase signals P1 to P6 will be disabled during the entire period (such as a high voltage level VH), so that the pixel PX stops emitting the light during the vertical blank period P_VBK.

Figure 4:
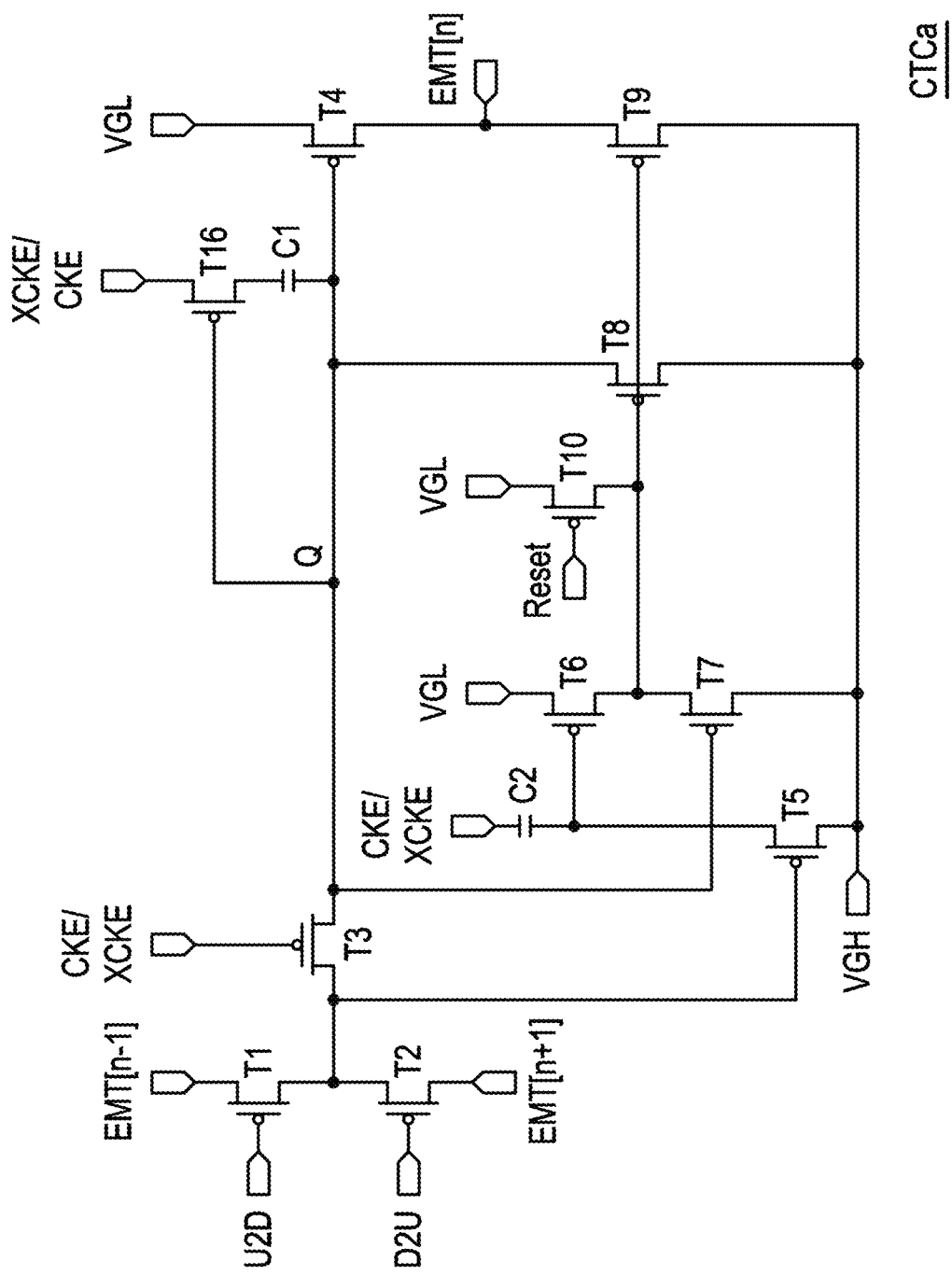
FIG. 4 is a schematic circuit diagram of a timing control circuit according to an embodiment of the disclosure.

FIG. 4 is a schematic circuit diagram of a timing control circuit according to an embodiment of the disclosure. Referring to FIGS. 2 and 4, in this embodiment, compared to the timing control circuit CTC, a timing control circuit CTCa further includes a transistor T16 (corresponding to a eleventh transistor). The P-type transistor is taken as an example for the transistor T16, but the embodiment of the disclosure is not limited thereto. The transistor T16 has a first end receiving the other one of the clock signals CK and XCK, a control end receiving the internal voltage Q, and a second end. The first capacitor C1 is coupled between the second end of the transistor T16 and the control end of the transistor T4.

When the timing control circuit CTC is not operating, the internal voltage Q enables the transistor T16 to be cut off to turn off the other one of the clock signals CK and XCK from the first capacitor C1. Therefore, a high-frequency transient current of the transistor T8 may be completely eliminated, thereby suppressing deterioration of the transistor T8.

Figure 5:
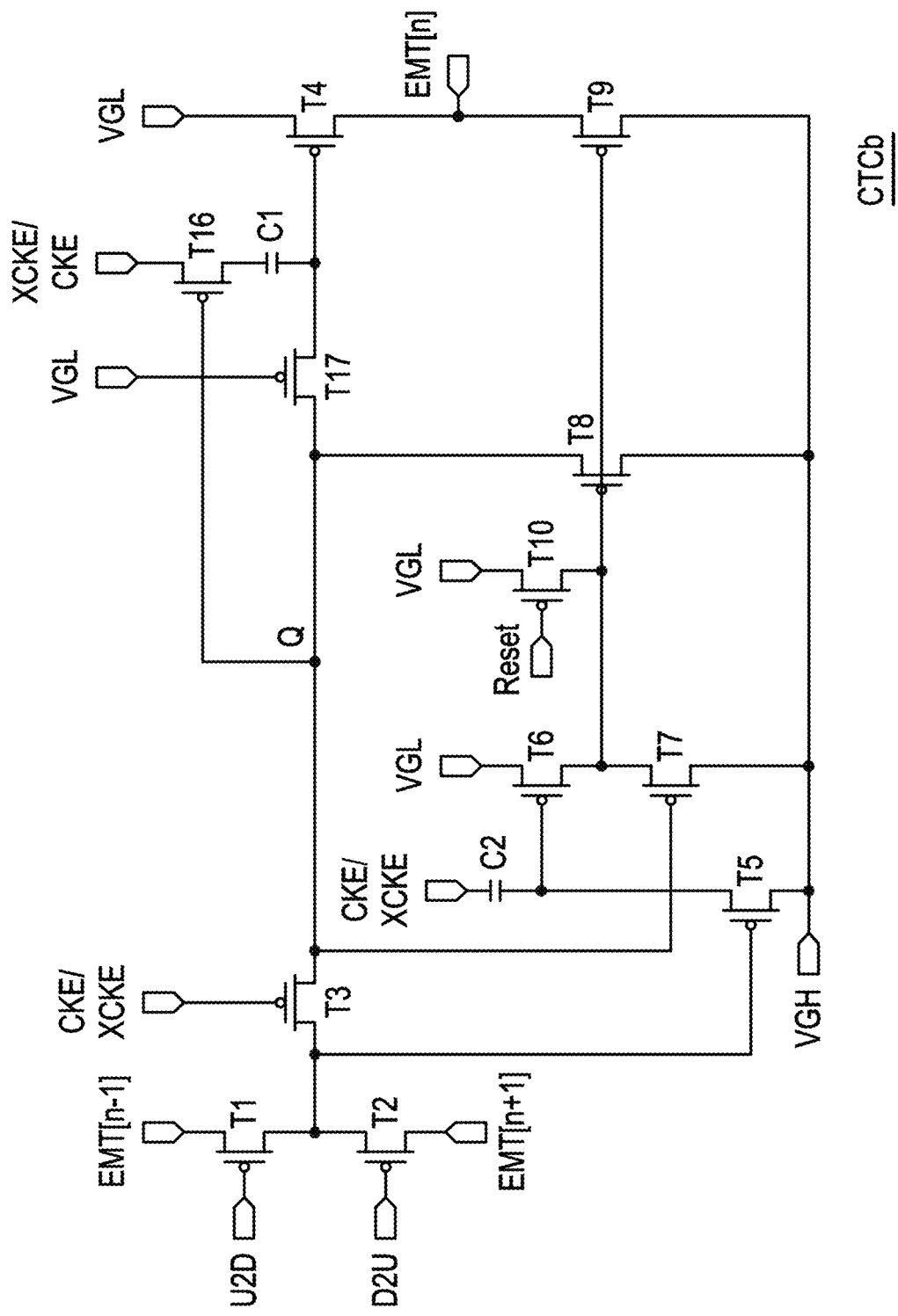
FIG. 5 is a schematic circuit diagram of a timing control circuit according to another embodiment of the disclosure.

FIG. 5 is a schematic circuit diagram of a timing control circuit according to another embodiment of the disclosure. Referring to FIGS. 2, 4, and 5, in this embodiment, compared to the timing control circuit CTCa, a timing control circuit CTCb further includes a transistor T17 (corresponding to a twelfth transistor). The P-type transistor is taken as an example for the transistor T17, but the embodiment of the disclosure is not limited thereto. The transistor T17 has a first end receiving the internal voltage Q, a control end receiving the first gate voltage VGL, and a second end coupled to the control end of the transistor T4. The transistor T17 may be used to block a voltage between the second end of the transistor T3 and the control end of the transistor T4.

Figure 6:
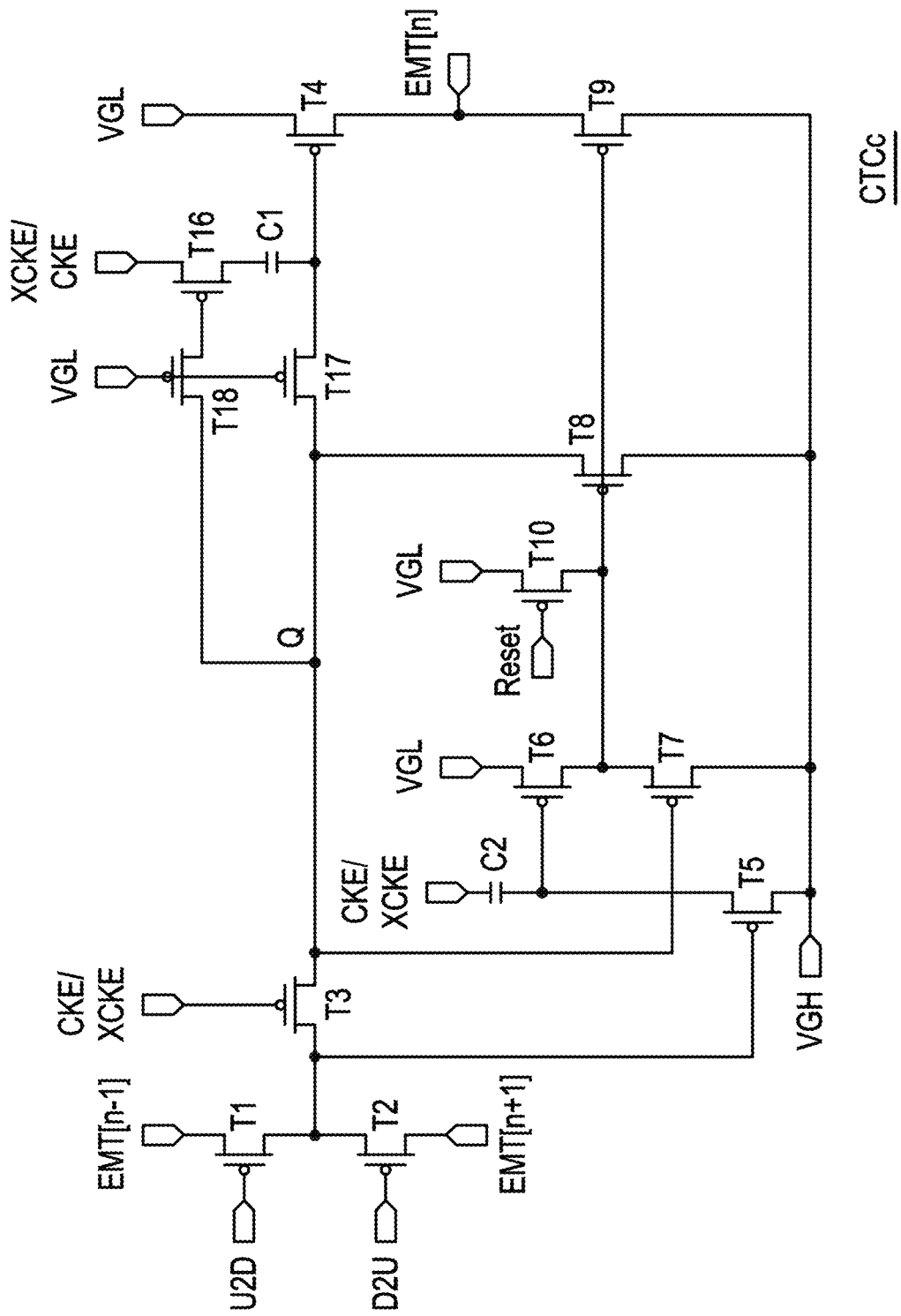
FIG. 6 is a schematic circuit diagram of a timing control circuit according to still another embodiment of the disclosure.

FIG. 6 is a schematic circuit diagram of a timing control circuit according to still another embodiment of the disclosure. Referring to FIGS. 2 and 4 to 6, in this embodiment, compared to the timing control circuit CTCb, a timing control circuit CTCc further includes a transistor T18 (corresponding to a thirteenth transistor). The P-type transistor is taken as an example for the transistor T18, but the embodiment of the disclosure is not limited thereto. The transistor T18 has a first end receiving the internal voltage Q, a control end receiving the first gate voltage VGL, and a second end coupled to the control end of the transistor T16. The addition of the transistor T18 may prevent deterioration of a larger cross-voltage of the transistors T7 and T8.

Figure 7:
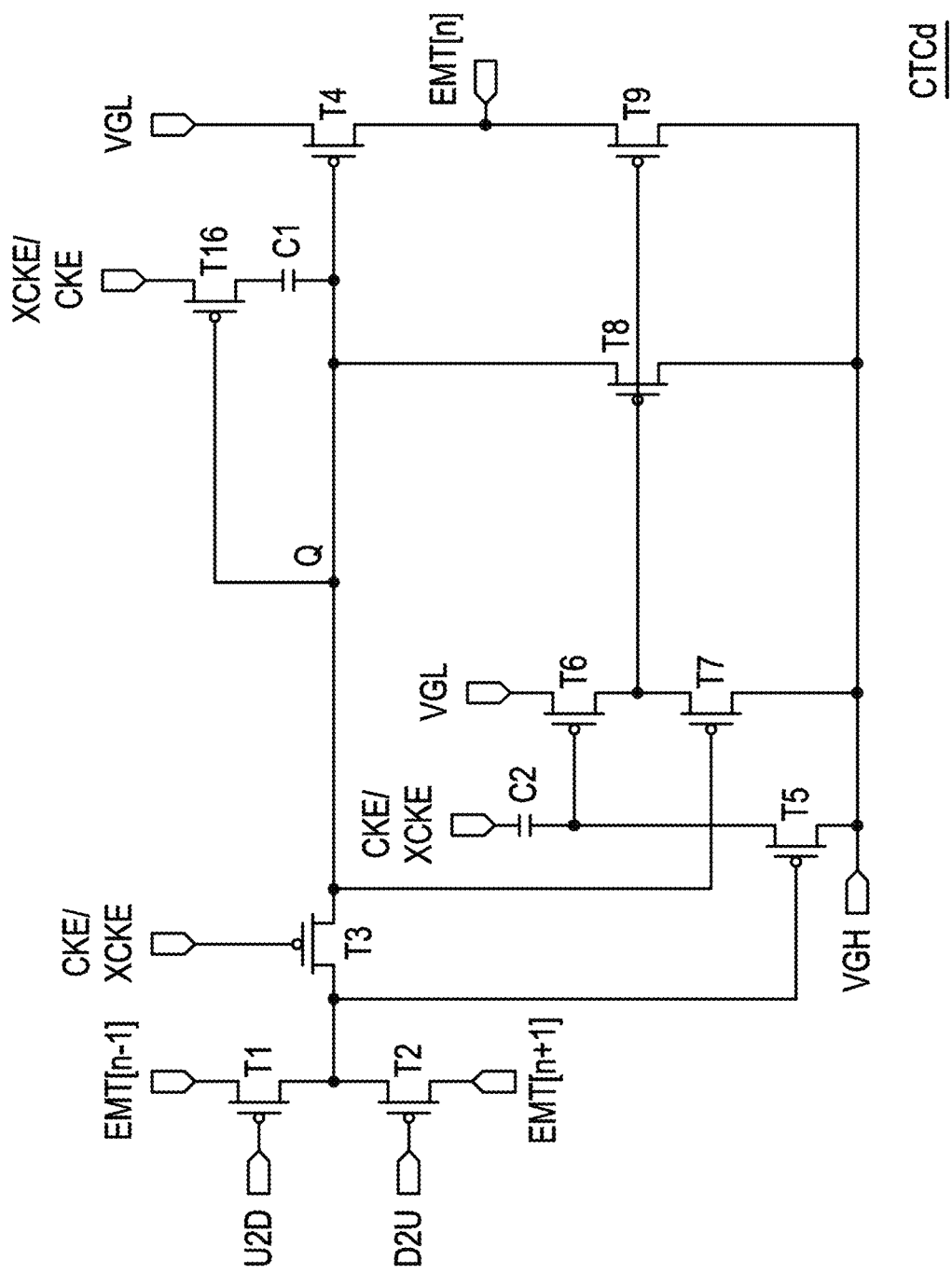
FIG. 7 is a schematic circuit diagram of a timing control circuit according to yet another embodiment of the disclosure.

FIG. 7 is a schematic circuit diagram of a timing control circuit according to yet another embodiment of the disclosure. Referring to FIGS. 2, 4 and 7, in this embodiment, compared to the timing control circuit CTCa, the transistor T10 is omitted in a timing control circuit CTCd, but the degradation of the larger cross-voltage of the transistor T8 may still be prevented.

Figure 8:
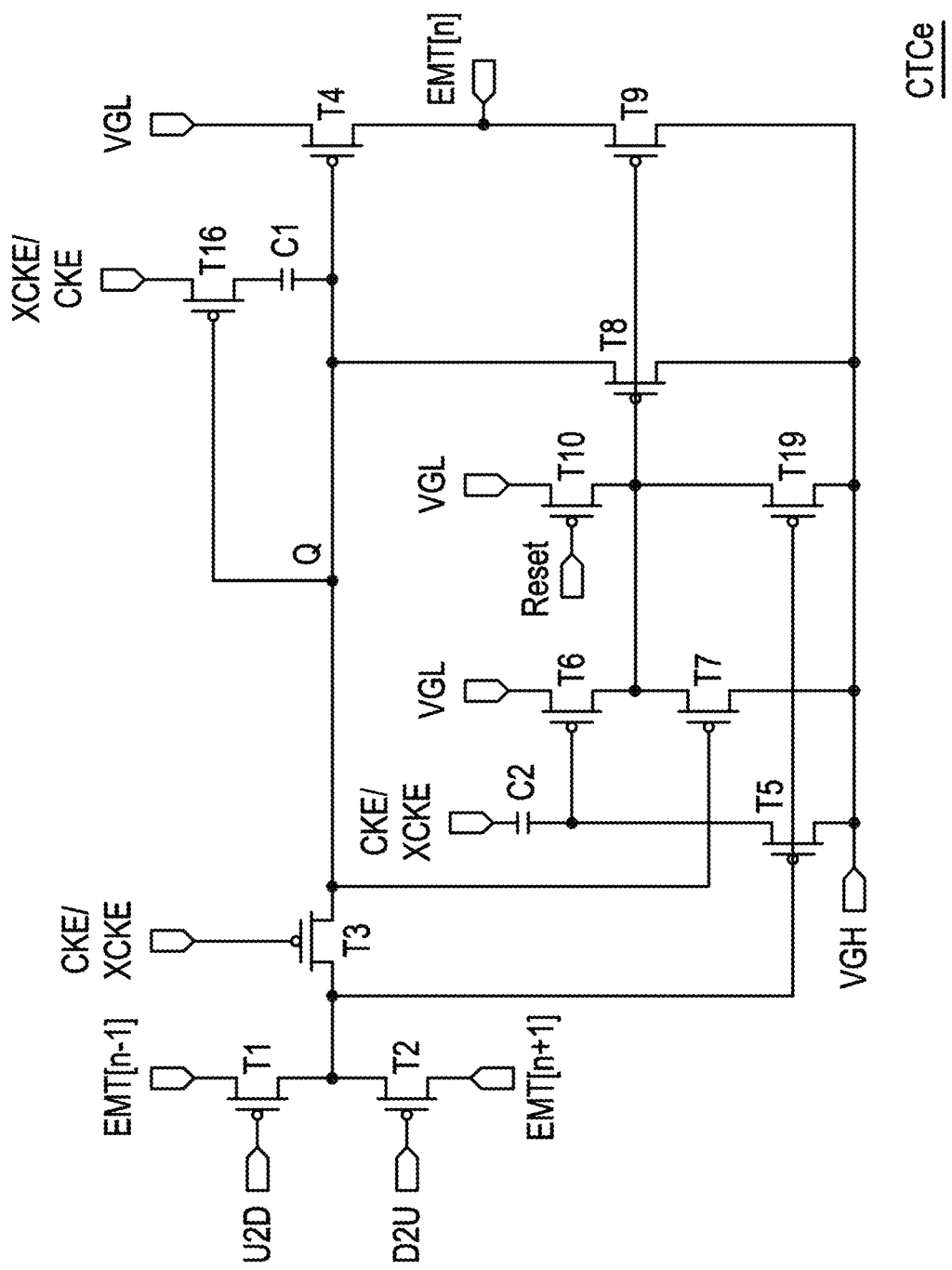
FIG. 8 is a schematic circuit diagram of a timing control circuit according to another embodiment of the disclosure.

FIG. 8 is a schematic circuit diagram of a timing control circuit according to another embodiment of the disclosure. Referring to FIGS. 2, 4, and 8, in this embodiment, compared to the timing control circuit CTCa, a timing control circuit CTCe further includes a transistor T19 (corresponding to a fourteenth transistor). The P-type transistor is taken as an example for the transistor T19, but the embodiment of the disclosure is not limited thereto. The transistor T19 has a first end coupled to the control end of the transistor T8, a control end coupled to the second end of the transistor T1, and a second end coupled to the control end of the transistor T4. Turning-on of the transistor T19 may turn off the transistor T8 to avoid a competitive relationship between the transistors T3 and T8.

Figure 9:
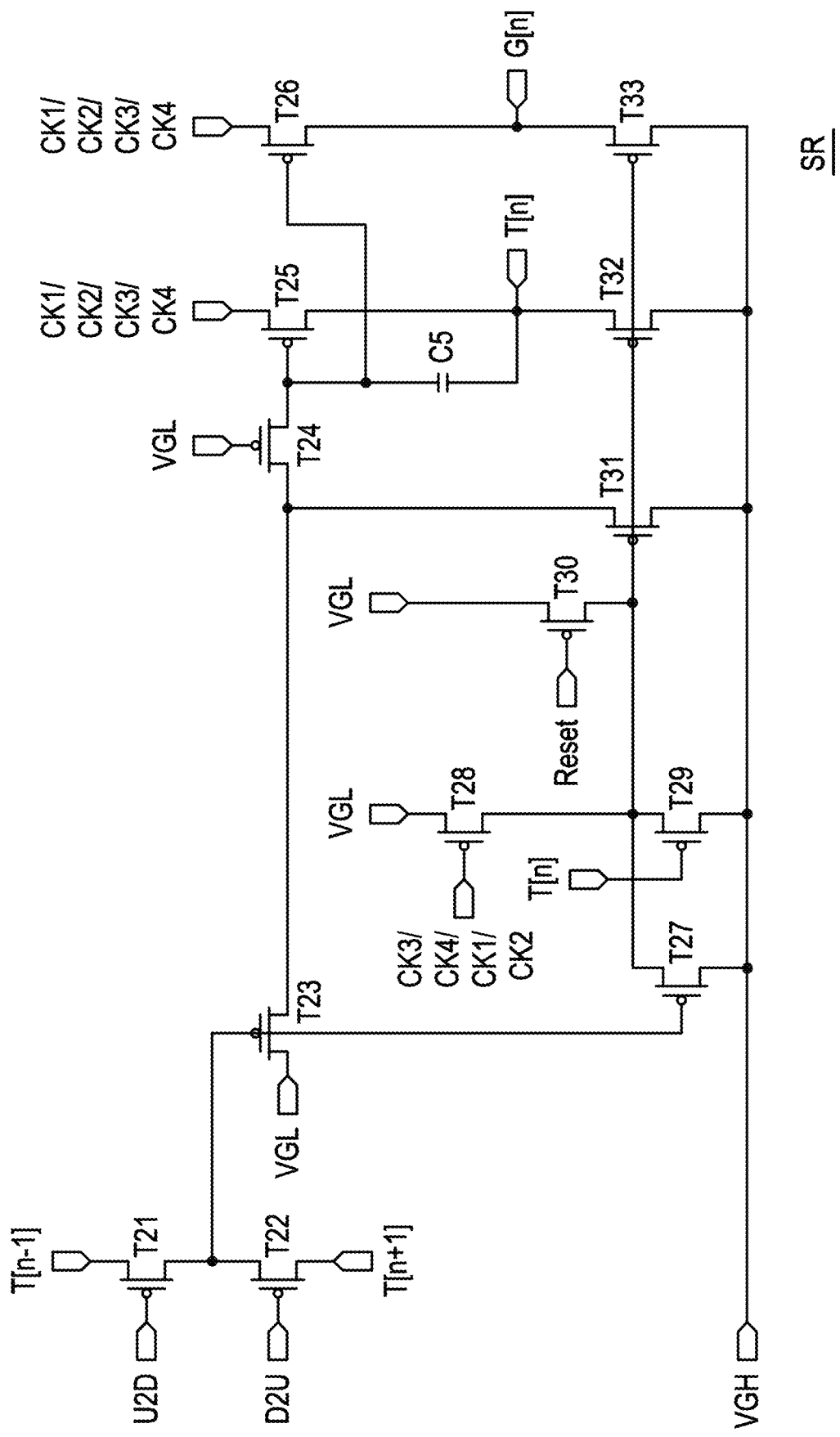
FIG. 9 is a schematic circuit diagram of a shift register according to an embodiment of the disclosure.

FIG. 9 is a schematic circuit diagram of a shift register according to an embodiment of the disclosure. Referring to FIGS. 1 and 9, in this embodiment, a shift register SR (e.g., one of the shift registers SR1 to SR3) includes transistors T21 to T32 and a capacitor C5. The P-type transistor is taken as an example for the transistors T21 to T32, but the embodiment of the disclosure is not limited thereto.

The transistor T21 has a first end receiving a previous gate timing signal T[n−1], a control end receiving the first direction scanning signal U2D, and a second end, where n is a positive integer. The transistor T22 has a first end coupled to the second end of the transistor T21, a control end receiving the second direction scanning signal D2U, and a second end receiving a subsequent gate timing signal T[n+1]. The transistor T23 has a first end receiving the first gate voltage VGL, a control end coupled to the second end of the transistor T21, and a second end.

The transistor T24 has a first end coupled to the second end of the transistor T23, a control end receiving the first gate voltage VGL, and a second end. The transistor T25 has a first end receiving one of the clock signals (such as CK1 to CK4), a control end coupled to the second end of the transistor T24, and a second end providing a gate timing signal T[n]. The capacitor C5 is coupled between the control end of the transistor T25 and the second end of the transistor T25. The transistor T26 has a first end receiving one of the clock signals (such as CK1 to CK4), a control end coupled to the second end of the transistor T24, and a second end providing a gate driving signal G[n].

The transistor T27 has a first end, a control end coupled to the second end of the transistor T21, and a second end receiving the second gate voltage VGH. The transistor T28 has a first end receiving the first gate voltage VGL, a control end receiving another one of the clock signals (such as CK1 to CK4), and a second end coupled to the first end of the transistor T27. In the embodiment of the disclosure, when one of the received clock signals (such as CK1 to CK4) is the clock signal CK1, another one of the received clock signals (such as CK1 to CK4) may be the clock signal CK3. When one of the received clock signals (such as CK1 to CK4) is the clock signal CK2, another one of the received clock signals (such as CK1 to CK4) may be the clock signal CK2, and the rest may be derived by analogy. That is to say, one of the received clock signals (such as CK1 to CK4) and another one of the received clock signals (such as CK1 to CK4) may be complementary (or inverted) or have a phase difference of 180 degrees, which may depend on the circuit design, and the embodiment of the disclosure is not limited thereto.

The transistor T29 has a first end coupled to the second end of the transistor T28, a control end receiving the gate timing signal T[n], and a second end receiving the second gate voltage VGH. The transistor T30 has a first end receiving the first gate voltage VGL, a control end receiving the reset signal Reset, and a second end coupled to the second end of the transistor T28.

The transistor T31 has a first end coupled to the second end of the transistor T23, a control end coupled to the second end of the transistor T28, and a second end receiving the second gate voltage VGH. The transistor T32 has a first end coupled to the second end of the transistor T25, a control end coupled to the second end of the transistor T28, and a second end receiving the second gate voltage VGH. The transistor T33 has a first end coupled to the second end of the transistor T26, a control end coupled to the second end of the transistor T28, and a second end receiving the second gate voltage VGH.

Figure 11:
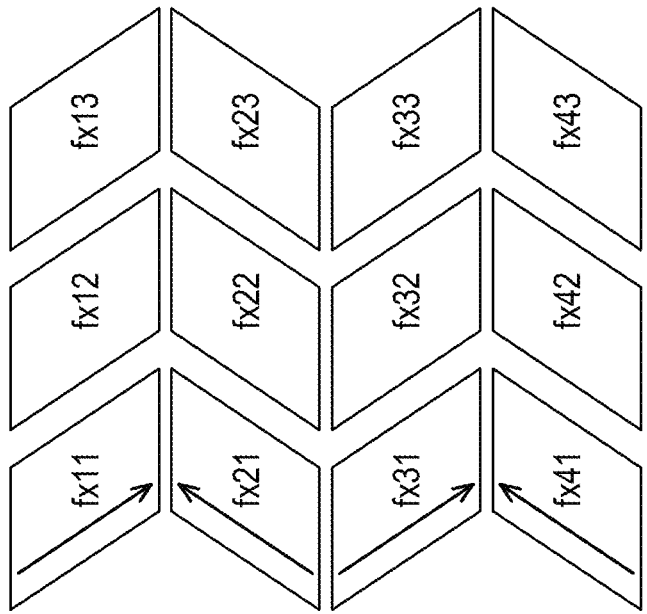
FIG. 11 is a schematic diagram of a scanning timing of a display module according to an embodiment of the disclosure.
Figure 10:
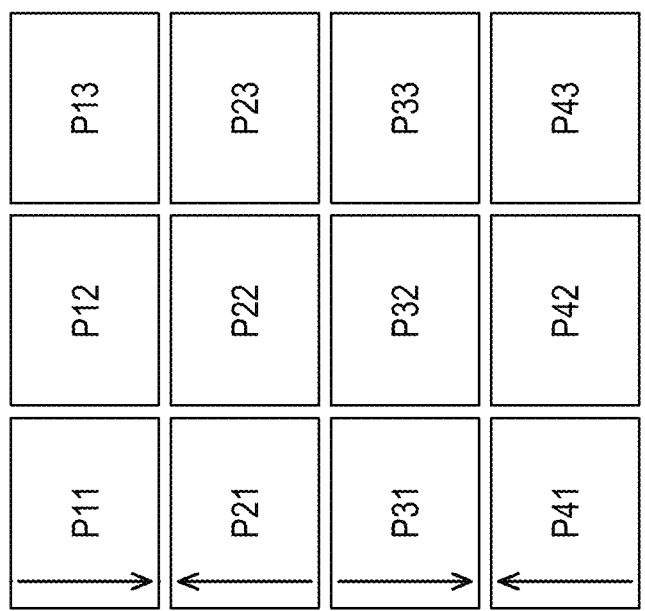
FIG. 10 is a schematic diagram of a system of a display module according to an embodiment of the disclosure.

FIG. 10 is a schematic diagram of a system of a display module according to an embodiment of the disclosure. FIG. 11 is a schematic diagram of a scanning timing of a display module according to an embodiment of the disclosure. Referring to FIGS. 1, 10, and 11, in this embodiment, a display module 120a includes multiple display panels P11 to P43 arranged in an array. As shown in frame scanning timings fx11 to fx43, scanning directions of the display panels P11 to P43 in odd-numbered rows are different from scanning directions of the display panels P11 to P43 in even-numbered rows. For example, the display panels P11 to P13 and P31 to P33 in the odd-numbered rows may scan an image from top to bottom (i.e., image display) (or called forward scanning), while the display panels P21 to P23 And P41 to P43 in the even-numbered rows may scan the image from bottom to top (or called reverse scanning), so that there will be no obvious broken images at junctions of the display panel P11 to P43, so as to improve a situation of jagged frames.

Figure 12:
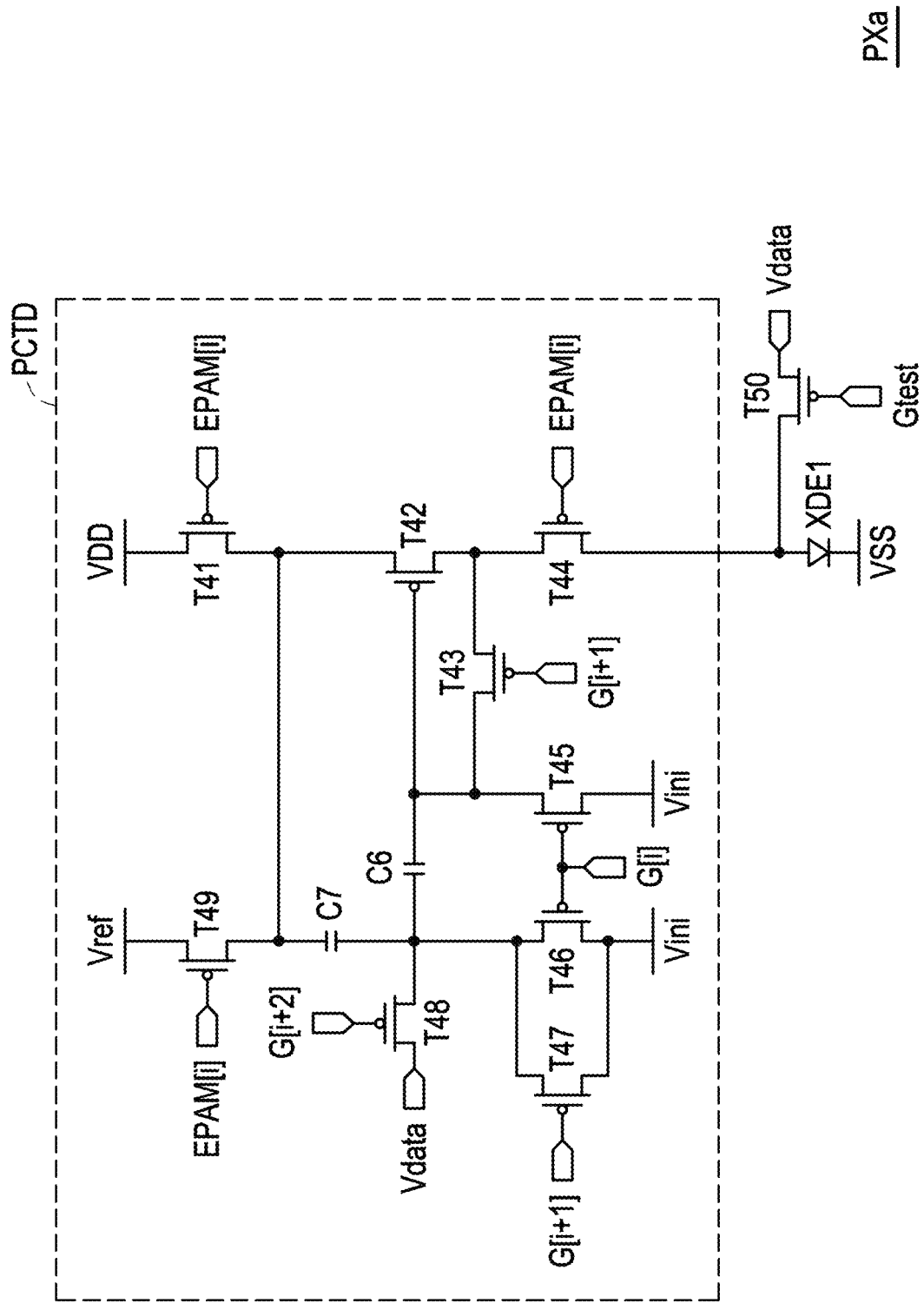
FIG. 12 is a schematic circuit diagram of a pixel according to an embodiment of the disclosure.

FIG. 12 is a schematic circuit diagram of a pixel according to an embodiment of the disclosure. Referring to FIGS. 1 and 12, in this embodiment, each of the pixels PX may refer to a pixel PXa as shown, and the pixel PXa includes a pixel driving circuit PCTD, a light-emitting diode XDE1, and a transistor T50 (corresponding to a first test transistor). The P-type transistor is taken as an example for the transistor T50, but the embodiment of the disclosure is not limited thereto.

The light-emitting diode XDE1 has an anode and a cathode receiving a system low voltage VSS. The pixel driving circuit PCTD is coupled between a system high voltage VDD and the anode of the light-emitting diode XDE1. The transistor T50 has a first end coupled to the anode of the light-emitting diode XDE1, a control end receiving a global test signal Gtest, and a second end receiving a data voltage Vdata. In this way, through the transistor T50, defects/short circuits of the light-emitting diode XDE1 may be detected in an unit of each of vertical lines.

In this embodiment, the pixel driving circuit PCTD includes transistors T41 to T49 and capacitors C6 and C7. The P-type transistor is taken as an example for the transistors T41 to T49, but the embodiment of the disclosure is not limited thereto.

The transistor T41 has a first end receiving the system high voltage VDD, a control end receiving a corresponding light-emitting driving signal EPAM[i], and a second end. The transistor T42 has a first end coupled to the second end of the transistor T41, a control end, and a second end. The transistor T43 has a first end coupled to the control end of the transistor T42, a control end receiving a corresponding gate driving signal G[i+1], and a second end coupled to the second end of the transistor T42.

The transistor T44 has a first end coupled to the second end of the transistor T42, a control end receiving the corresponding light-emitting driving signal EPAM[i], and a second end coupled to the anode of the light-emitting diode XDE1. The transistor T45 has a first end coupled to the control end of the transistor T42, a control end receiving a corresponding gate driving signal G[i], and a second end receiving an initial voltage Vini. The transistor T46 has a first end, a control end receiving the corresponding gate driving signal G[i], and a second end receiving the initial voltage Vini.

The capacitor C6 is coupled between the control end of the transistor T42 and the first end of the transistor T46. The transistor T47 has a first end coupled to the first end of the transistor T46, a control end receiving the corresponding gate driving signal G[i+1], and a second end receiving the initial voltage Vini. The transistor T48 has a first end receiving the data voltage Vdata, a control end receiving a corresponding gate driving signal G[i+2], and a second end coupled to the first end of the transistor T46.

The transistor T49 has a first end receiving a reference voltage Vref, a control end receiving the corresponding light-emitting driving signal EPAM[i], and a second end. The capacitor C7 is coupled between the second end of the transistor T42 and the first end of the transistor T46.

Figure 13:
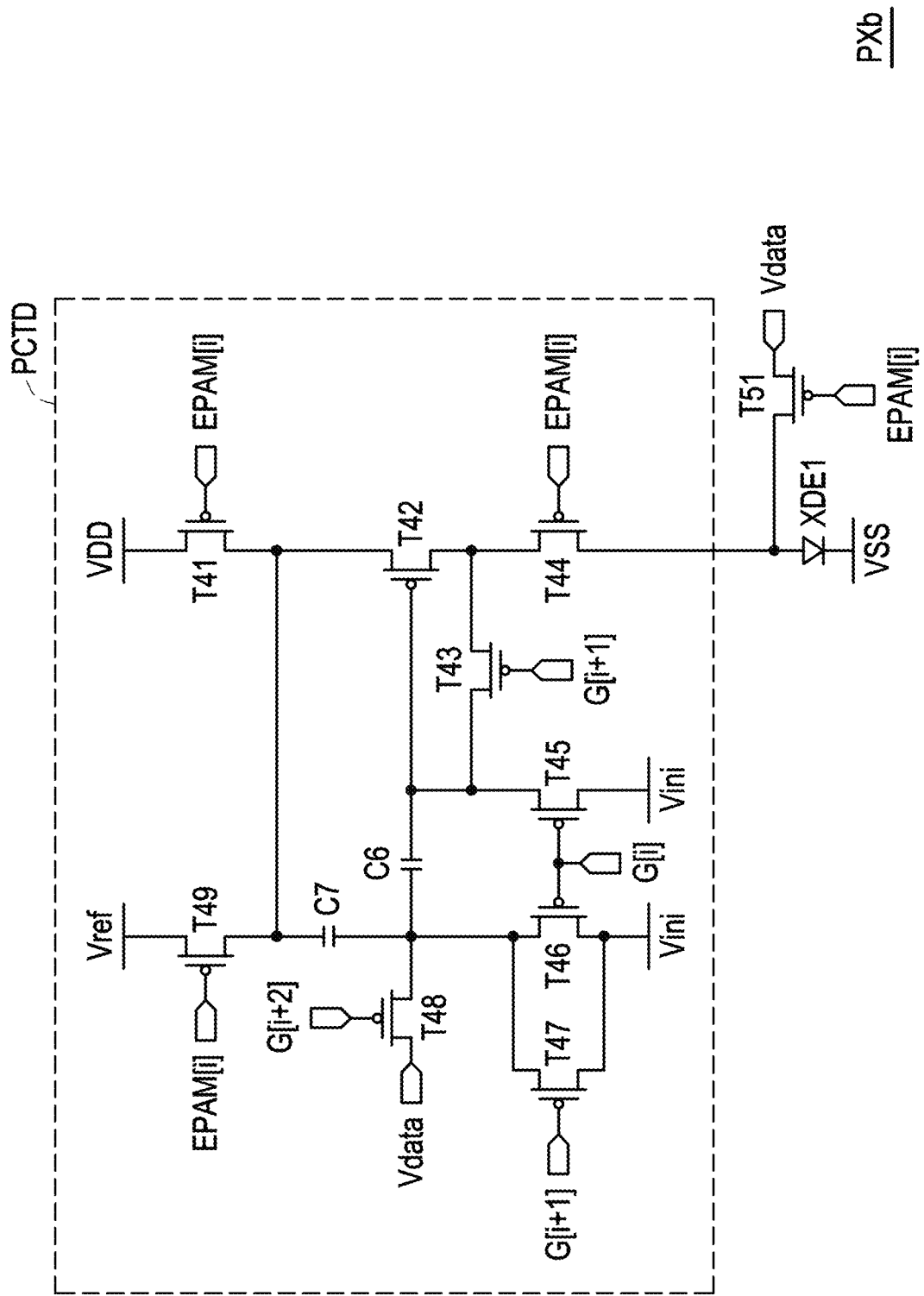
FIG. 13 is a schematic circuit diagram of a pixel according to another embodiment of the disclosure.

FIG. 13 is a schematic circuit diagram of a pixel according to another embodiment of the disclosure. Referring to FIGS. 1, 12, and 13, in this embodiment, a pixel PXb is substantially the same as the pixel PXa, and the same or similar elements will be denoted by the same or similar reference numerals. In this embodiment, a difference between the pixel PXb and the pixel PXa lies in the transistor T50 and a transistor T51 (corresponding to a fourth test transistor). The control end of the transistor T50 receives the global test signal Gtest, but a control end of the transistor T51 receives the corresponding light-emitting driving signal EPAM[i]. In this way, through the transistor T51, the defects/short circuits of the light-emitting diode XDE1 may be detected in an unit of each of the pixels PXb.

Figure 14:
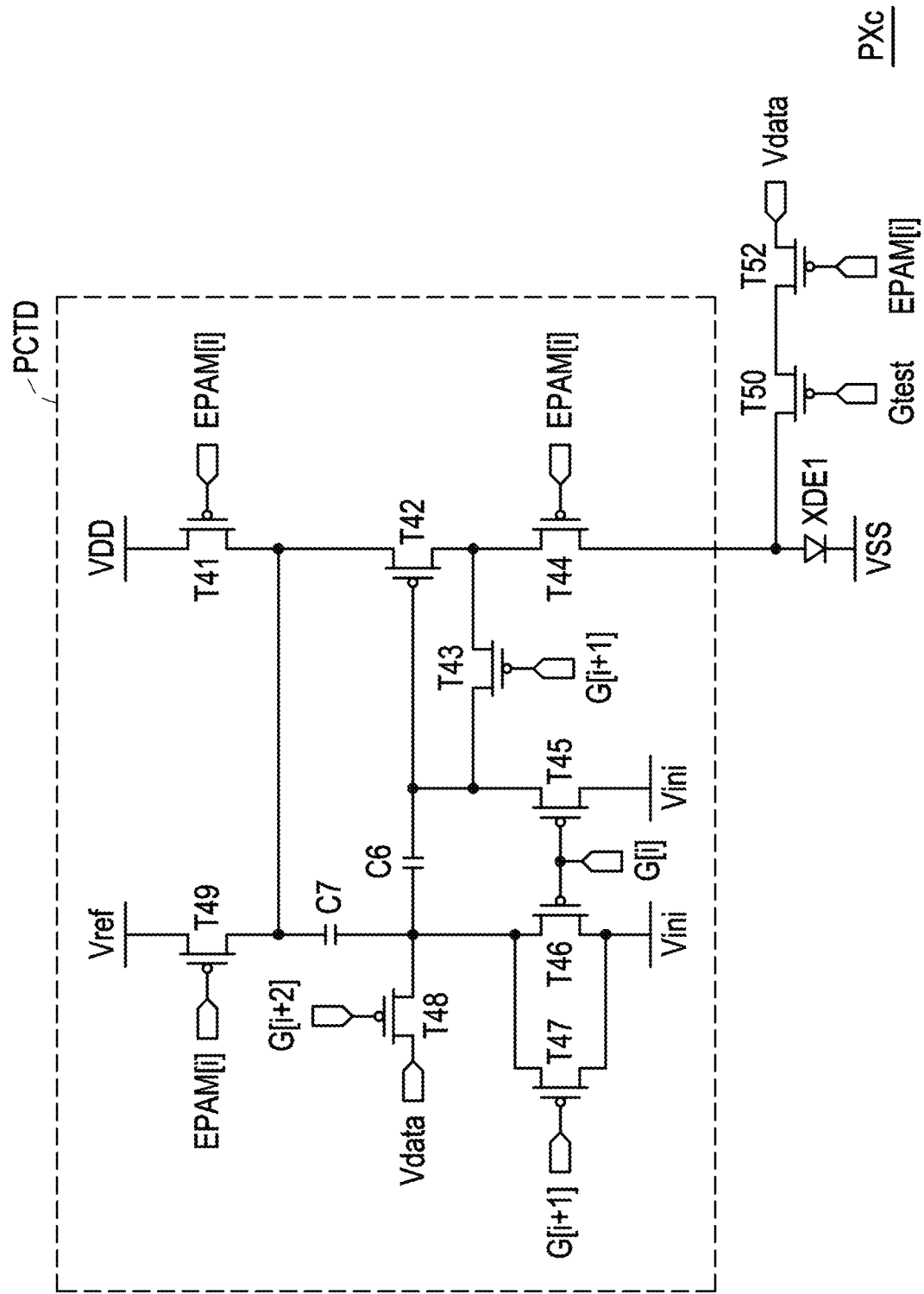
FIG. 14 is a schematic circuit diagram of a pixel according to still another embodiment of the disclosure.

FIG. 14 is a schematic circuit diagram of a pixel according to still another embodiment of the disclosure. Referring to FIGS. 1, 12, and 14, in this embodiment, a pixel PXc is substantially the same as the pixel PXa, and the same or similar elements will be denoted by the same or similar reference numerals. In this embodiment, the pixel PXc further includes a transistor T52 (corresponding to a second test transistor). The transistor T52 has a first end coupled to the second end of the transistor T50, a control end receiving the corresponding light-emitting driving signal EPAM[i], and a second end receiving the data voltage Vdata. In this way, through the transistor T52, the defects/short circuits of the light-emitting diode XDE1 may be detected in the unit of each of the pixels PXb.

Figure 15:
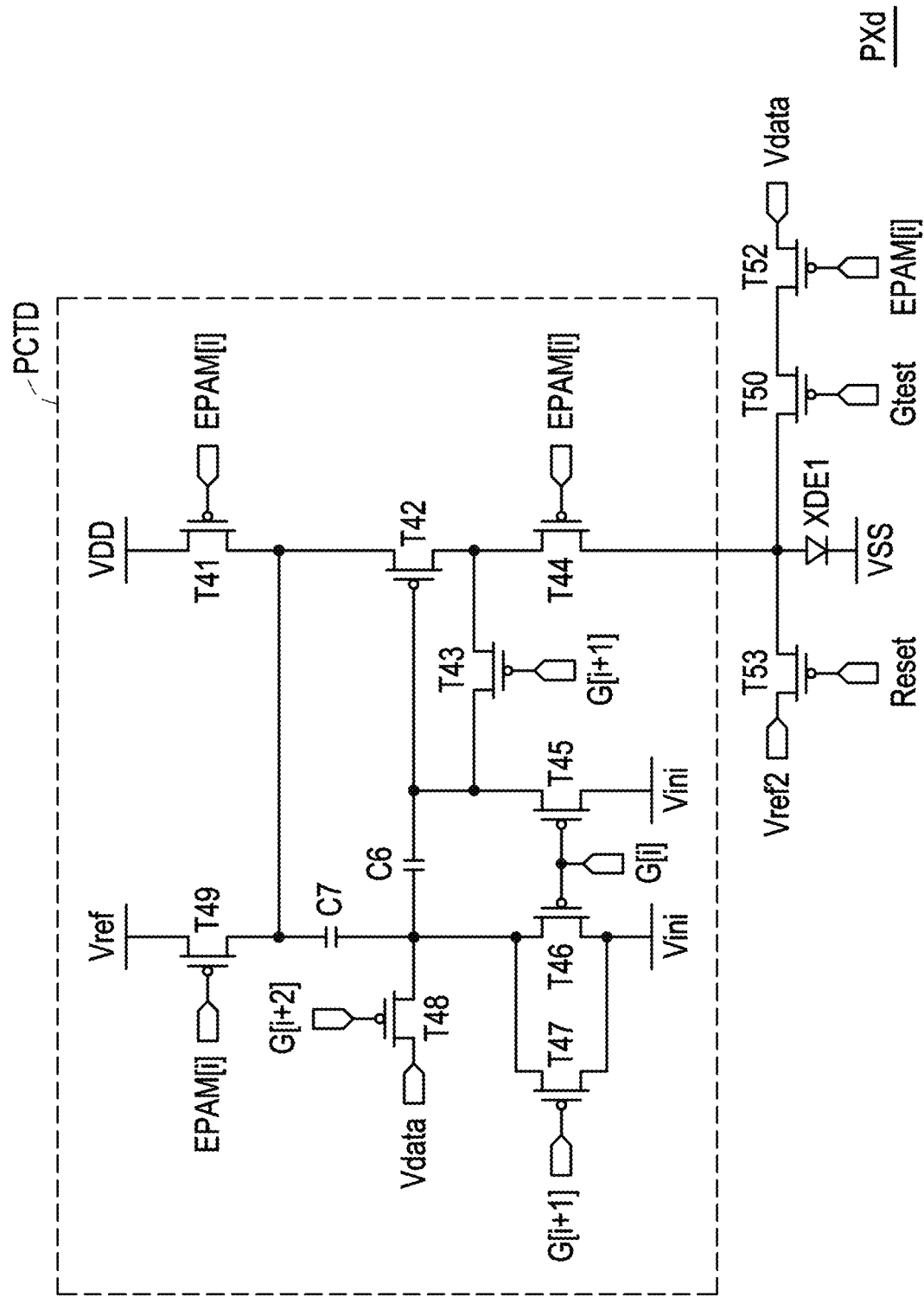
FIG. 15 is a schematic circuit diagram of a pixel according to yet another embodiment of the disclosure.

FIG. 15 is a schematic circuit diagram of a pixel according to yet another embodiment of the disclosure. Referring to FIGS. 1, 12, 14, and 15, in this embodiment, a pixel PXd is substantially the same as the pixel PXc, and the same or similar elements will be denoted by the same or similar reference numerals. In this embodiment, the pixel PXd further includes a transistor T53 (corresponding to a third test transistor). The transistor T53 has a first end coupled to the anode of the light-emitting diode XDE1, a control end receiving the reset signal Reset, and a second end receiving a reference voltage Vref2. In this way, through the transistor T52, the defects/short circuits of the light-emitting diode XDE1 may be detected in the unit of each of the pixels PXb, and through the transistor T53, a voltage level of the anode may be reset.

Based on the above, in the display apparatus of the embodiment of the disclosure, the light-emitting driver provides the multiple enabled light-emitting driving signals based on the phase signals, and the phase signals all present the disabled levels during the vertical blank period, so that the light-emitting driving signals provided by the light-emitting driving circuit will be disabled at the same time. In this way, the display apparatus may enable the pixels to stop emitting the light during the vertical blank period under the multi-light-emitting operation, so as to detect the abnormality of the panel in the display module.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A display apparatus, comprising:
   a display module, comprising a plurality of pixels arranged in an array;
   a plurality of light-emitting driving circuits, wherein each of the light-emitting driving circuits comprises:
      a timing control circuit receiving a plurality of clock signals and a previous light-emitting timing signal to provide a light-emitting timing signal and an internal voltage; and
      a driving circuit receiving a first phase signal among a plurality of phase signals and the internal voltage, and providing a light-emitting driving signal to the display module based on the first phase signal and the internal voltage to enabled the plurality of pixels emitting light multiple times during one frame period,
   wherein the phase signals all present a disabled level during a vertical blank period.

2. The display apparatus according to claim 1, wherein the timing control circuit comprises:
   a first transistor having a first end receiving the previous light-emitting timing signal, a control end receiving a first direction scanning signal, and a second end;
   a second transistor having a first end coupled to the second end of the first transistor, a control end receiving a second direction scanning signal, and a second end receiving a subsequent light-emitting timing signal;
   a third transistor having a first end coupled to the second end of the first transistor, a control end receiving a first clock signal of the clock signals, and a second end coupled to the internal voltage;
   a fourth transistor having a first end receiving a first gate voltage, a control end receiving the internal voltage, and a second end providing the light-emitting timing signal;
   a first capacitor coupled between a second clock signal of the clock signals and the control end of the fourth transistor;
   a fifth transistor having a first end, a control end coupled to the second end of the first transistor, and a second end receiving a second gate voltage;
   a second capacitor coupled between the first clock signal and the first end of the fifth transistor;
   a sixth transistor having a first end receiving the first gate voltage, a control end coupled to the first end of the fifth transistor, and a second end;
   a seventh transistor having a first end coupled to the second end of the sixth transistor, a control end receiving the internal voltage, and a second end receiving the second gate voltage;
   an eighth transistor having a first end receiving the internal voltage, a control end coupled to the second end of the sixth transistor, and a second end receiving the second gate voltage;
   a ninth transistor having a first end coupled to the second end of the fourth transistor, a control end coupled to the second end of the sixth transistor, and a second end receiving the second gate voltage; and
   a tenth transistor having a first end receiving the first gate voltage, a control end receiving a reset signal, and a second end coupled to the second end of the sixth transistor.

3. The display apparatus according to claim 2, wherein the timing control circuit further comprises:
   an eleventh transistor having a first end receiving the second clock signal, a control end receiving the internal voltage, and a second end, wherein the first capacitor is coupled between the second end of the eleventh transistor and the control end of the fourth transistor.

4. The display apparatus according to claim 3, wherein the timing control circuit further comprises:
   a twelfth transistor having a first end receiving the internal voltage, a control end receiving the first gate voltage, and a second end coupled to the control end of the fourth transistor.

5. The display apparatus according to claim 4, wherein the timing control circuit further comprises:
   a thirteenth transistor having a first end receiving the internal voltage, a control end receiving the first gate voltage, and a second end coupled to the control end of the eleventh transistor.

6. The display apparatus according to claim 2, wherein the timing control circuit further comprises:
   a fourteenth transistor having a first end coupled to the control end of the eighth transistor, a control end coupled to the second end of the first transistor, and a second end coupled to the control end of the fourth transistor.

7. The display apparatus according to claim 2, wherein the driving circuit comprises:
   a fifteenth transistor having a first end receiving the first gate voltage, a control end receiving the internal voltage, and a second end;
   a sixteenth transistor having a first end coupled to the second end of the fifteenth transistor, a control end receiving the first gate voltage, and a second end;
   a seventeenth transistor having a first end receiving the first phase signal, a control end coupled to the second end of the sixteenth transistor, and a second end providing the light-emitting driving signal;

a third capacitor coupled between the control end of the seventeenth transistor and the second end of the seventeenth transistor;
an eighteenth transistor having a first end coupled to the second end of the fifteenth transistor, a control end coupled to the second end of the sixth transistor, and a second end receiving the second gate voltage;
a fourth capacitor coupled between the second end of the fifteenth transistor and the second gate voltage; and
a nineteenth transistor having a first end coupled to the second end of the seventeenth transistor, a control end coupled to the second end of the sixth transistor, and a second end receiving the second gate voltage.

8. The display apparatus according to claim 1, wherein the display module comprises a plurality of display panels arranged in an array, and scanning directions of the display panels in odd-numbered rows are different from scanning directions of the display panels in even-numbered rows.

9. The display apparatus according to claim 1, wherein each of the pixels comprises:
a light-emitting diode having an anode and a cathode receiving a system low voltage;
a pixel driving circuit coupled between a system high voltage and the anode;
a first test transistor having a first end coupled to the anode, a control end receiving a global test signal, and a second end receiving a data voltage.

10. The display apparatus according to claim 9, wherein each of the pixels further comprises:
a second test transistor having a first end coupled to the second end of the first test transistor, a control end receiving a corresponding light-emitting driving signal, and a second end receiving the data voltage.

11. The display apparatus according to claim 10, wherein each of the pixels further comprises:
a third test transistor having a first end coupled to the anode, a control end receiving a reset signal, and a second end receiving a reference voltage.

12. The display apparatus according to claim 1, wherein the display module comprises a plurality of pixels arranged in an array, and each of the pixels comprises:
a light-emitting diode having an anode and a cathode receiving a system low voltage;
a pixel driving circuit coupled between a system high voltage and the anode; and
a fourth test transistor having a first end coupled to the anode, a control end receiving a corresponding light-emitting driving signal, and a second end receiving a data voltage.

13. A display apparatus, comprising:
a display module;
a plurality of light-emitting driving circuits coupled to the display module, wherein each of the light-emitting driving circuits comprises:
a first transistor having a first end receiving a previous light-emitting timing signal, a control end receiving a first direction scanning signal, and a second end;
a second transistor having a first end coupled to the second end of the first transistor, a control end receiving a second direction scanning signal, and a second end receiving a subsequent light-emitting timing signal;
a third transistor having a first end coupled to the second end of the first transistor, a control end receiving a first clock signal, and a second end coupled to an internal voltage;
a fourth transistor having a first end receiving a first gate voltage, a control end receiving the internal voltage, and a second end providing a light-emitting timing signal;
a first capacitor coupled between a second clock signal and the control end of the fourth transistor;
a fifth transistor having a first end, a control end coupled to the second end of the first transistor, and a second end receiving a second gate voltage;
a second capacitor coupled between the first clock signal and the first end of the fifth transistor;
a sixth transistor having a first end receiving the first gate voltage, a control end coupled to the first end of the fifth transistor, and a second end;
a seventh transistor having a first end coupled to the second end of the sixth transistor, a control end receiving the internal voltage, and a second end receiving the second gate voltage;
an eighth transistor having a first end receiving the internal voltage, a control end coupled to the second end of the sixth transistor, and a second end receiving the second gate voltage; and
a ninth transistor having a first end coupled to the second end of the fourth transistor, a control end coupled to the second end of the sixth transistor, and a second end receiving the second gate voltage.

14. The display apparatus according to claim 13, wherein each of the light-emitting driving circuits further comprises:
a tenth transistor having a first end receiving the first gate voltage, a control end receiving a reset signal, and a second end coupled to the second end of the sixth transistor.

15. The display apparatus according to claim 13, wherein each of the light-emitting driving circuits further comprises:
an eleventh transistor having a first end receiving the second clock signal, a control end receiving the internal voltage, and a second end, wherein the first capacitor is coupled between the second end of the eleventh transistor and the control end of the fourth transistor.

16. The display apparatus according to claim 15, wherein each of the light-emitting driving circuits further comprises:
a twelfth transistor having a first end receiving the internal voltage, a control end receiving the first gate voltage, and a second end coupled to the control end of the fourth transistor.

17. The display apparatus according to claim 16, wherein each of the light-emitting driving circuits further comprises:
a thirteenth transistor having a first end receiving the internal voltage, a control end receiving the first gate voltage, and a second end coupled to the control end of the eleventh transistor.

18. The display apparatus according to claim 13, wherein each of the light-emitting driving circuits further comprises:
a fourteenth transistor having a first end coupled to the control end of the eighth transistor, a control end coupled to the second end of the first transistor, and a second end coupled to the control end of the fourth transistor.

* * * * *